M. A. PHILLIPS.
VEHICLE TIRE.
APPLICATION FILED NOV. 17, 1910.
992,052.
Patented May 9, 1911.
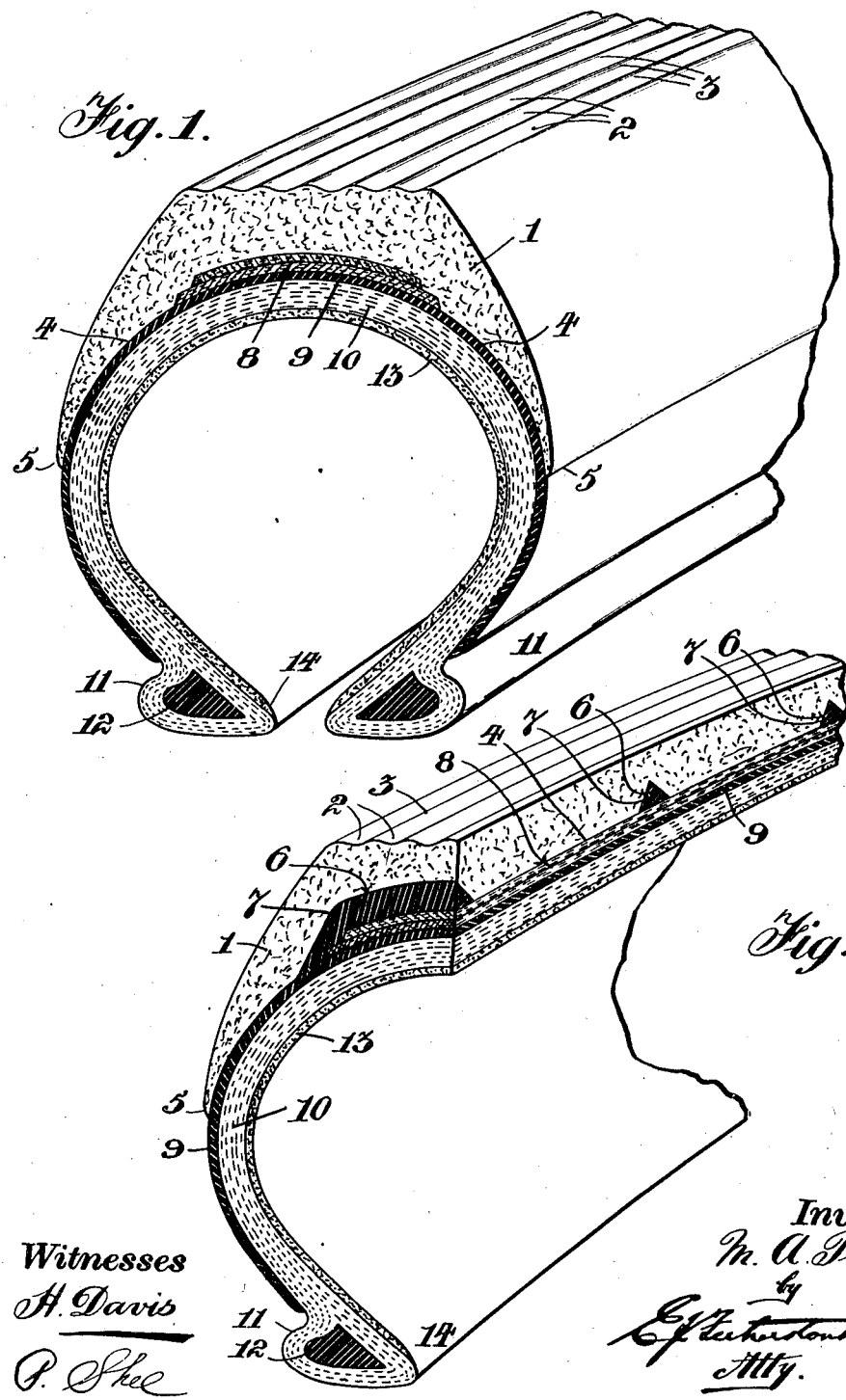

UNITED STATES PATENT OFFICE.

MARY AMBER PHILLIPS, OF MONTREAL, QUEBEC, CANADA.

VEHICLE-TIRE.

992,052.

Specification of Letters Patent.

Patented May 9, 1911.

Application filed November 17, 1910. Serial No. 592,902.

*To all whom it may concern:*

Be it known that I, MARY AMBER PHILLIPS, resident of 330 Lagauchetiere street west, in the city and district of Montreal, in the Province of Quebec, in the Dominion of Canada, a citizen of the United States of America, have invented certain new and useful Improvements in Vehicle-Tires, of which the following is a specification.

The invention relates to improvements in vehicle tires, as described in the present specification and illustrated in the accompanying drawings that form part of the same.

The invention consists essentially in disposing the parts in such an arrangement so that a felt tread may be used to the best advantage.

The objects of the invention are to devise a tire that will last longer than any present known form of tires, to overcome the danger and difficulties incident to the skidding of vehicle wheels, and generally to provide a practical construction, simple and cheap to manufacture, and very durable.

In the drawings, Figure 1 is a sectional perspective view of a portion of a pneumatic tire omitting the air tube. Fig. 2 is a perspective detail showing the tire in longitudinal and cross section.

Like numerals of reference indicate corresponding parts in each figure.

Referring to the drawings, 1 is the outer layer of felt pressed or woven and having the circumferential grooves 2 forming corrugations on the tread portion 3, the outer surface of said layer from said tread 3, with the inner laterally curved surface 4, tapering to the points 5 at each side of the tire. The outer layer of felt 1 is preferably waterproof.

6 are lateral V-shaped cavities in the inner surface 4 of the outer layer 1 and occurring at intervals completely around said layer.

7 are rubber fillings in the cavities 6.

8 is a breaker strip of rubbered fabric secured to the rubber fillings 7, which in turn are secured to the inner surface 4 in the cavities 6.

9 is a rubber padding secured to the breaker strip 8, and the inner surface 4 and extending downwardly beyond the points 5.

10 is the inner layer of rubber filled fabric to which the rubber padding 9 is secured, said inner layer being brought around in the customary tire shape to the heels 11, which have the central filling 12 of hard rubber. This construction is well known and does not concern the arrangement of the layers hereinbefore set forth.

13 is a lining of fabric impregnated with asbestos and completely covering the inner wall of the inner layer 10 and secured thereto and preferably terminating at each side at the points 14 of the heels 11.

It will be thus seen that a tire for containing an inner tube, inflated with air, is provided which will resist any ordinary usage even very hard usage, for the outer layer on which the tread surface is formed, is of solid felt and it is well known that felt is a very good non-skid material. The other layers, that is the padding and the inner layer, which may be taken together, are securely held to the felt which is to some extent a foreign material, as compared with the said padding and inner layer, and safely locked by the breaker strip and the rubber filling in the cavities. This arrangement is the most effective means of using the felt tread, though it must be understood that said arrangement may be modified to some extent without departing from the spirit of the invention, so long as the latitude in construction is kept within the limits of the claims for novelty which follow this description.

The lining to the inner wall of the layer 10 is also very important, as it is an asbestos filled fabric, that is a woven material thoroughly impregnated with asbestos, or it may be a woven asbestos lining, though for all practical purposes, the fabric impregnated with the asbestos is preferable. This lining will prevent any ulterior effects of heat generated during the use of the tire from penetrating the layers and will also minimize the heat generated, which so often leads to the explosion of a tire.

The tire, as described, is a construction that lends itself very readily in the manufacture to the use of methods already known extensively in the tire trade, and it will be noticed that the vulcanization of the parts for the purposes of adhering them one to the other can be readily accomplished.

What I claim as my invention is:

1. In a vehicle tire, a rubber outer surface, an outer layer of felt forming a suitable tread surface and having cavities in the inner surface thereof, rubber fillings in said cavities, and a breaker strip of rubbered fabric held to said rubber fillings on one side and to said outer surface on the other side and securely locking said felt layer in position on said outer surface.

2. In a vehicle tire, an outer rubber surface, a felt portion partially embracing said surface, forming a tread portion and formed with laterally arranged V-shaped cavities in the inner surface occurring at intervals completely therearound, rubber fillings in said cavities and a breaker strip between said felt portion and said outer rubber surface and adapted with said felt portion and said surface to lock the former to the latter subsequent to the vulcanization of all the parts.

Signed at the city and district of Montreal, in the Province of Quebec, in the Dominion of Canada, this 12th day of November, 1910.

MARY AMBER PHILLIPS.

Witnesses:
G. H. GIESEDDER,
P. SHEE.